(12) United States Patent
Logtenberg (10) Patent No.: US 10,043,158 B2
(45) Date of Patent: *Aug. 7, 2018

(54) METHODS AND SYSTEMS FOR A WEB-BASED CALENDAR APPLICATION

(71) Applicant: Time.ly Network Inc., Guelph (CA)

(72) Inventor: Rik Logtenberg, Vancouver (CA)

(73) Assignee: Time.ly Network Inc., Guelph, Ontario ( * ) Notice: Subject to any disclaimer, the term of this patent is extended or adjusted under 35 U.S.C. 154(b) by 10 days.

This patent is subject to a terminal disclaimer.

(21) Appl. No.: 15/170,592

(22) Filed: Jun. 1, 2016

(65) Prior Publication Data

US 2016/0275456 A1 Sep. 22, 2016

Related U.S. Application Data

(63) Continuation of application No. 13/607,456, filed on Sep. 7, 2012, now Pat. No. 9,384,472.

(51) Int. Cl.
| | |
|---|---|
| *G06F 17/22* | (2006.01) |
| *G06Q 10/10* | (2012.01) |
| *G06Q 10/06* | (2012.01) |
| *G06Q 50/00* | (2012.01) |

(52) U.S. Cl.
CPC ..... *G06Q 10/1093* (2013.01); *G06F 17/2247* (2013.01); *G06F 17/2288* (2013.01); *G06Q 10/06314* (2013.01); *G06Q 10/109* (2013.01); *G06Q 50/01* (2013.01)

(58) Field of Classification Search
CPC .. G06Q 10/00; G06Q 10/109; G06Q 10/1093; G06Q 10/06314; G06Q 50/01; H04L 67/1095; H04L 67/28; H04L 67/02; H04L 67/2823; G06F 17/2247; G06F 17/2288
See application file for complete search history.

(56) References Cited

U.S. PATENT DOCUMENTS

| | | | |
|---|---|---|---|
| 6,369,840 B1 | 4/2002 | Barnett et al. |
| 6,380,959 B1 | 4/2002 | Wang et al. |
| 6,604,059 B2 | 8/2003 | Strubbe et al. |
| 6,728,530 B1 | 4/2004 | Heinonen et al. |
| 7,970,793 B2 | 6/2011 | Davia et al. |
| 8,037,021 B2 | 10/2011 | Adler et al. |
| 8,126,922 B2 | 2/2012 | Holzpfel et al. |

(Continued)

OTHER PUBLICATIONS

Zoho free online appointment calendar application; www.zoho.com/calendar; Jun. 29, 2012.

*Primary Examiner* — Maikhanh Nguyen
(74) *Attorney, Agent, or Firm* — McCarthy Tétrault (57) ABSTRACT

A calendar platform is provided for creating an event calendar for publication on a website and sharing events between different calendars. A method for creating an online calendar includes creating at least one event post in the calendar and retrieving from a web server a calendar feed corresponding to a second calendar. For each one of the events in the calendar feed, a new event post for the event is created if the event does not match one of the previously created event posts in the calendar. An event category is assigned to the new event post based on settings defined for the calendar feed. An Internet user viewing the calendar can filter the events by category and export selected events to the user's calendar.

14 Claims, 5 Drawing Sheets

(56) References Cited

U.S. PATENT DOCUMENTS

| | | |
|---|---|---|
| 8,280,984 B2 | 10/2012 | Lance et al. |
| 8,352,455 B2 * | 1/2013 | Tareen ............... G06F 17/30722 |
| | | 707/711 |
| 8,667,009 B2 | 3/2014 | Voigt et al. |
| 9,053,466 B2 | 6/2015 | Caceres |
| 9,117,204 B2 | 8/2015 | Hubner et al. |
| 9,646,288 B2 * | 5/2017 | Price .................... G06Q 10/109 |
| 2001/0049617 A1 * | 12/2001 | Berenson ............. G06Q 10/107 |
| | | 709/201 |
| 2005/0278641 A1 | 12/2005 | Mansour et al. |
| 2006/0184617 A1 | 8/2006 | Nicholas et al. |
| 2006/0247961 A1 | 11/2006 | Klemow |
| 2007/0159651 A1 | 7/2007 | Disario et al. |
| 2008/0141145 A1 * | 6/2008 | Klausmeier .......... G06Q 10/109 |
| | | 715/751 |
| 2008/0162614 A1 | 7/2008 | Hurmola |
| 2008/0244091 A1 | 10/2008 | Moore et al. |
| 2008/0250334 A1 * | 10/2008 | Price .................... G06Q 10/109 |
| | | 715/753 |
| 2008/0294994 A1 | 11/2008 | Kruger et al. |
| 2008/0313260 A1 | 12/2008 | Sweet et al. |
| 2009/0019107 A1 | 1/2009 | Lance et al. |
| 2009/0030899 A1 * | 1/2009 | Tareen ............... G06F 17/30722 |
| 2009/0100018 A1 | 4/2009 | Roberts |
| 2009/0100332 A1 * | 4/2009 | Kanjilal ............... G06Q 10/109 |
| | | 715/235 |
| 2009/0112986 A1 | 4/2009 | Caceres |
| 2009/0132665 A1 * | 5/2009 | Thomsen ............. G06Q 10/107 |
| | | 709/206 |
| 2009/0198728 A1 | 8/2009 | Davia et al. |
| 2009/0222488 A1 * | 9/2009 | Boerries ........... G06F 17/30884 |
| 2009/0265623 A1 | 10/2009 | Kho et al. |
| 2010/0153851 A1 * | 6/2010 | Sullivan ............... G06Q 10/109 |
| | | 715/733 |
| 2011/0225015 A1 | 9/2011 | Spivack et al. |
| 2012/0084286 A1 | 4/2012 | Hubner et al. |
| 2012/0102415 A1 | 4/2012 | Deng et al. |
| 2012/0185486 A1 * | 7/2012 | Voigt ...................... H04L 51/32 |
| | | 707/741 |
| 2013/0021370 A1 * | 1/2013 | Dunn .................... G06Q 10/10 |
| | | 345/629 |
| 2013/0024511 A1 * | 1/2013 | Dunn .................... G06Q 10/10 |
| | | 709/204 |

* cited by examiner

METHODS AND SYSTEMS FOR A WEB-BASED CALENDAR APPLICATION

RELATED APPLICATIONS

This application is a continuation of U.S. application Ser. No. 13/607,456 filed on 7 Sep. 2012 and entitled "METHODS AND SYSTEMS FOR A WEB-BASED CALENDAR APPLICATION", the entire teaching and disclosure of which are incorporated by reference thereto.

TECHNICAL FIELD

This invention relates to web-based calendars. In particular this invention relates to methods and systems for creating and managing calendars.

BACKGROUND

Information about upcoming events is often published on websites. Each website typically maintains and posts its own schedule of events. For example, a community centre may post on its website a schedule of events occurring at the community centre. Similarly, a theatre company may post on its website a schedule of theatre performances.

A large volume of event information is publicly available online. Because event postings are distributed among numerous websites, it can be difficult to compile a list of relevant events. For example, in order to build a calendar of upcoming events for a tourism website, it may be necessary to conduct extensive Internet searches and gather information from several individual websites such as the websites of tourism attractions, restaurants, bars, event organizers, event promoters, community centres, theatres, etc. Given the constraints of Internet searches, it may be possible to locate only some of the events that would be suitable for inclusion in the tourism website's calendar. In addition, it may be necessary to repeat the Internet searches and revisit the individual websites to keep the tourism website's calendar up-to-date. This can be a tedious and time-consuming process.

An Internet user who wants to find out about upcoming events may also need to conduct Internet searches and/or visit several individual websites in order to locate such information. To keep informed of new upcoming events the user may need to conduct Internet searches on an ongoing basis and visit each website which provides event information. All of these steps take time. In addition, the Internet user may miss finding out about certain events given the limitations of Internet searches and given that event information is distributed over a very large number of sites.

There is a general desire for a web-based calendaring system that addresses the aforementioned problems.

The foregoing examples of the related art and limitations related thereto are intended to be illustrative and not exclusive. Other limitations of the related art will become apparent to those of skill in the art upon a reading of the specification and a study of the drawings.

SUMMARY

One aspect of the invention provides a method for generating a calendar for publication on a first website. The method includes creating at least one event post in the calendar, and retrieving from a web server a calendar feed having at least one event. The calendar feed corresponds to a second calendar published on a second website. For each one of the events in the calendar feed, the method proceeds by determining whether there is a match to one of the previously created event posts in the calendar, and creating in the calendar a new event post for the event if there is no match.

In some embodiments, the method includes retrieving an updated calendar feed from the web server, and for each one of the events in the updated calendar feed, determining whether there is a match to one of the previously created event posts in the calendar. The method proceeds by updating the previously created event post with information corresponding to the event in the case of a match, and creating in the calendar a new event post for the event if there is no match.

Creating a new event post in the calendar may comprise assigning at least one of a category and tag to the event based on a predefined setting for the calendar feed.

Another aspect provides a system for generating a calendar for publication on a first website. The system includes a global event server configured to store information about event posts which have been created in calendars. The system also includes a first web server configured to create at least one event post in the calendar, and retrieve from a web server a calendar feed comprising at least one event, the calendar feed corresponding to a second calendar published on a second website. For each one of the events in the calendar feed, the first web server is configured to determine whether there is a match to one of the previously created event posts in the calendar, and, if there is no match, create in the calendar a new event post for the event and send the new event post to the global event server.

In some embodiments the first web server is configured to retrieve an updated calendar feed from the web server, and for each one of the events in the updated calendar feed, determine whether there is a match to one of the previously created event posts in the calendar. The first web server updates the previously created event post with information corresponding to the event in the case of a match, and creates in the calendar a new event post for the event if there is no match.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

In embodiments described herein, a calendar platform is provided for creating an event calendar for publication on a website. For example, an industry business association can create an event calendar on the calendar platform to provide details of networking receptions, conferences, business seminars and the like. The calendar includes information about each event such as the name or title and description of the event, when and where the event will be occurring, who is the organizer of the event, and contact and ticketing information.

One aspect provides methods and systems for sharing event information between different sites. The sharing of event information in some embodiments includes importing events from another calendar. For example, the industry business association can use methods and systems according to some embodiments to add to its own event calendar by importing events from the web-based calendars of partner organizations or other business associations.

In some embodiments, methods and systems for adding to a calendar include importing events from social networking sites or other websites, calendar feeds or databases which contain event information. An entire event feed, a subset of the events, or individual events can be imported from another calendar.

According to some embodiments, event information in a web-based calendar can be exported to other calendars. For example, an Internet user viewing the industry business association's calendar of events can use methods and systems according to some embodiments to export these events or a subset thereof to the user's calendar.

According to some embodiments, an Internet user can subscribe to an entire calendar feed, a subset of the events, or to individual events of a web-based calendar. Updates to the calendar can be provided to subscribers.

Other aspects provide methods and systems for publishing and displaying a web-based calendar to an Internet user. In some embodiments, the user can toggle between different views of the calendar. The different views may include agenda, week, day, month, posterboard and other views.

In some embodiments, one or more parameters are assigned to each event. An Internet user can filter the events by selecting one or more parameters so that only those events which match the selected parameters are displayed to the user. This feature may allow the Internet user to more quickly find the events which are of interest to him or her. The parameters may include, for example, categories, tags, and event location or venue.

Another aspect provides methods and systems for an Internet user viewing the web-based calendar to provide feedback to the event publisher, or to other Internet users viewing the calendar. The Internet user may provide feedback by providing a rating or score for an event, which is then stored in the calendar's event database. The rating or score may be indicative of the extent to which the user is interested in attending a particular event. An overall or average rating or score for an event as provided by Internet users may be displayed with the event in the event calendar.

A further aspect provides methods and systems for creating and maintaining a global event database. In certain embodiments, as events are added to an event calendar, the event information is sent to a global event server which causes the information to be stored in a global event database.

Figure 1:
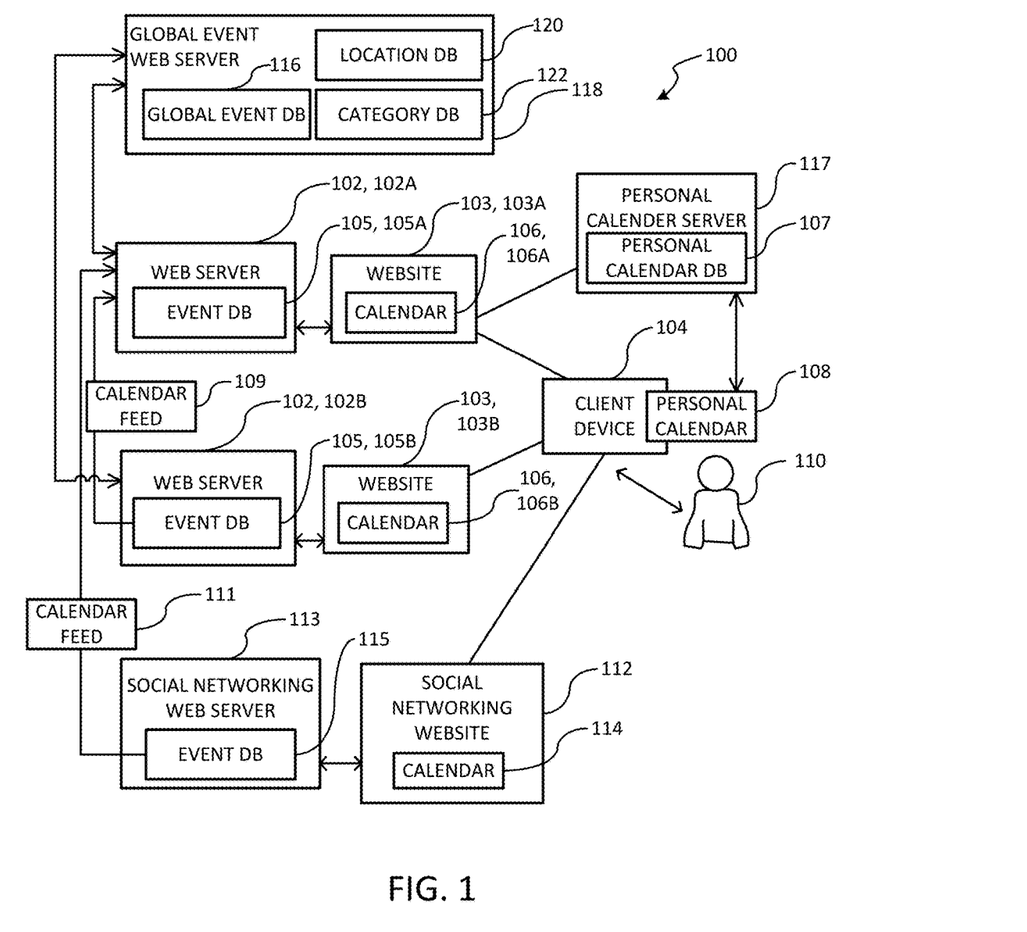
FIG. 1 schematically depicts the components of a system in which a web-based calendar platform according to an embodiment of the invention is provided.

FIG. 1 illustrates a system 100 in which a web-based calendar platform according to one embodiment is provided. System 100 includes one or more web servers 102 and one or more client devices 104. Web servers 102 and client devices 104 are connectable to one another by way of the Internet. Each web server 102 hosts one or more websites 103, each of which is deliverable to a client device 104 upon request by the client device 104. Client device 104 can be a personal computer, laptop, tablet, mobile device or smart phone or any other device capable of connecting to the Internet and displaying a webpage.

In the illustrated embodiment, each web server 102 includes an event database 105 corresponding to a website 103 hosted by web server 102. Event database 105 is not necessarily included in web server 102 as shown. In other embodiments event database 105 is provided in another server or storage device accessible to web server 102. Event database 105 stores information about upcoming events. For example, event database 105 may store the name or title and description of each event, when and where each event will be occurring, the organizer of each event, and contact and ticketing information. The information contained in event database 105 is published in an online calendar 106 on website 103 for viewing by Internet users 110 on their client devices 104.

For some websites 103, calendar 106 includes only native events that are created in the event database 105 directly by the organization, business or individual running the website 103. However, for other websites 103, to build a more comprehensive event calendar the administrator of the website 103 can import events from other sources to its calendar in accordance with the methods described herein. Imported events can be displayed alongside native events in website 103's calendar 106.

One method by which event information can be added to a calendar is to import the event information from calendars of other sites provided on the same calendar platform. For example, in the illustrated embodiment of FIG. 1, calendars 106A and 106B are provided on the same web-based calendar platform. The administrator of website 103A can import to its calendar 106A events from website 103B's calendar 106B. In the illustrated embodiment this is accomplished by retrieving from web server 102B a calendar feed 109 corresponding to calendar 106B. Calendar feed 109 contains all of or a subset of the events in web server 102B's event database 105B corresponding to calendar 106B. Web server 102A can be configured to add events contained in calendar feed 109 to website 103A's calendar 106A.

Another method by which event information can be added to a calendar is to import the events from calendars on other sites operating on a different calendar platform. For example, in the illustrated embodiment of FIG. 1, the administrator of website 103A can import to its calendar 106A events from a calendar 114 on social networking site 112. Calendar 114 is not necessarily provided on the same calendar platform as calendar 106A. Events from calendar 114 can be added to calendar 106A by importing a calendar feed 111 from social networking web server 113 which hosts social networking site 112. Calendar feed 111 contains all of or a subset of the events in social networking web server 113's event database 115 corresponding to calendar 114.

Calendar feeds 109 and 111 imported to calendar 106A may be filtered by one or more parameters such as category, tag and/or location. For example, the administrator of website 103 may filter the events in the calendar feeds so that only events of a certain category and location are imported to calendar 106A.

In some embodiments, a calendar's imported events stream is kept current. In the FIG. 1 embodiment, web server 102A retrieves calendar feed 109 from web server 102B and calendar feed 111 from social networking web server 113. The events contained in these feeds are added to calendar 106A. Web server 102A can be configured to query web server 102B and social networking web server 113 periodically for updates to their calendar feeds. The queries can be performed every few minutes or hourly, for example, depending on the settings provided to web server 102A. If a query to the other server determines that there have been updates since the last download, web server 102A downloads the current feed from the other server. In some embodiments, web server 102B is configured to provide push notifications to web server 102A when new events are added to calendar feed 109 or the events are otherwise updated. Web server 102A subsequently downloads the current feed from web server 102B. After downloading, the current calendar feeds are processed at web server 102A to update the events in calendar 106A. Processing the feed may include comparing the events in the feed against existing event posts in calendar 106A.

Some embodiments provide the ability to export events to another calendar. In the FIG. 1 embodiment, Internet user 110 at client device 104 maintains a personal calendar 108 which contains events stored in personal calendar database 107. Personal calendar database 107 is stored in a remote calendar server 117 accessible to Internet user 110 through client device 104. Personal calendar 108 is not necessarily operating on the same web-based calendar platform as provided by embodiments of the invention. In some cases, for example, personal calendar 108 is a Google™ or Facebook™ event calendar. In some cases, a local copy of personal calendar database 107 is stored at client device 104.

Internet user 110 can subscribe to a website 103's calendar 106. By subscribing to calendar 106, the events in calendar 106 are exported to a calendar maintained by Internet user 110. In the example shown in FIG. 1, Internet user 110 subscribes to online calendar 106A of website 103A hosted by web server 102A. The Internet user 110 can choose to subscribe to the entire calendar feed, a subset of the events, or to an individual event of online calendar 106. For example, Internet user 110 can choose to subscribe to only those events in calendar 106 which are within a certain category and/or have certain tags and/or are occurring at a particular location or venue. The subscription causes the selected event(s) to be exported to Internet user 110's personal calendar 108.

Calendar server 117 can be configured to query web server 102A periodically for updates to the subscribed events from calendar 106 so that Internet user 110's personal calendar 108 can be updated to reflect any additions, cancellations, or other modifications to the subscribed events. In other embodiments, web server 102A sends push notifications to the subscriber via calendar server 117 each time the subscribed events are updated. Calendar server 117 then downloads the current subscription feed and processes it to update the events in Internet user 110's personal calendar 108.

For a website 103's calendar 106, Internet user 110 can provide input to web server 102 via client device 104 to affect the manner in which the events are displayed at client device 104. In some embodiments, for example, Internet user 110 can toggle between different views of the calendar. These views may include agenda, week, day, month, posterboard and other views. In some embodiments Internet user 110 can filter the event view by one or more parameters. For example, in certain embodiments the event view can be filtered by category, tag and/or location. In some embodiments Internet user 110 can provide feedback to the event publisher or other Internet users 110 viewing the online calendar 106. The Internet user 110 may provide feedback by entering a rating or an indication of the user's interest in an event.

The illustrated embodiment of FIG. 1 includes a global event database 116 stored on or accessible by a global event server 118. Each time an event is added to an online calendar 106, the event is sent to global event server 118 which causes the event to be recorded in global event database 116. The information that is sent to global event server 118 may include details about the event such as event name or title, description, host, location and time. In some embodiments, administrators of a web-based calendar such as online calendar 106 may define settings causing all, some, or no events to be communicated to global event server 118. In certain embodiments, an Application Program Interface enables the communication of event information between global event server 118 and local web server 102A.

The illustrated embodiment of FIG. 1 also shows a location database 120 at global event server 118. Location database 120 may contain a table of locations of events entered in global event database 116. Similarly, a category database 122 may be provided at global event server 118. Category database 122 may contain a table of categories of events entered in global event database 116.

It is not necessary that global event database 116, location database 120 and category database 122 reside on global event server 118. In some embodiments, one or more of such databases may be on a different server which is in communication with global event server 118.

The purposes for which the information contained in global event database 116, location database 120 and/or category database 122 can be used include, for example:
event planning and promotion (e.g. by event promoters);
building calendars of events wherein the events are grouped based on one or more criteria (e.g. geographical location, interest group, cost, etc.);
building a central location index, wherein each event is assigned a standardized location and each location has a corresponding calendar of events;
providing an events search engine;
notifying event creators of duplications (e.g. more than one posting for the same event was created) or conflict with similar events in time and location;
providing a global event calendar application that allows users to search for and view events in the global event database;
providing an events-based social networking tool;
centralizing RSVP, commenting, rating and ticketing functions for events that are listed on multiple calendars (for example, if a user comments on an event in one calendar, the comment can be saved to global event database 116, and can be pushed to the same event on another calendar when that calendar's web server obtains the commenting information stored in global event database 116); and
the like Web server 102A or web server 102B may import events from global event database 116. For example, web server 102A may be configured so that any events satisfying certain criteria (e.g. occurring at a particular venue and/or of a certain category) are imported from global event database 116.

In particular embodiments, the methods described herein can be implemented by way of plug-in software for a content management system. The content management system may be WordPress, for example. The calendar's plug-in software includes various software functions which, when executed, cause the methods described herein to be performed. To enable creation and publication of a web-based calendar on the calendar platform described herein, the calendar software is installed on the web server which hosts the calendar's website. During the calendar creation process, event records are created and stored in an event database on the web server.

System 100 or portions thereof may be configured to implement one or more of the methods described herein. The methods are described in more detail below with reference to FIGS. 2 to 4.

Figure 2:
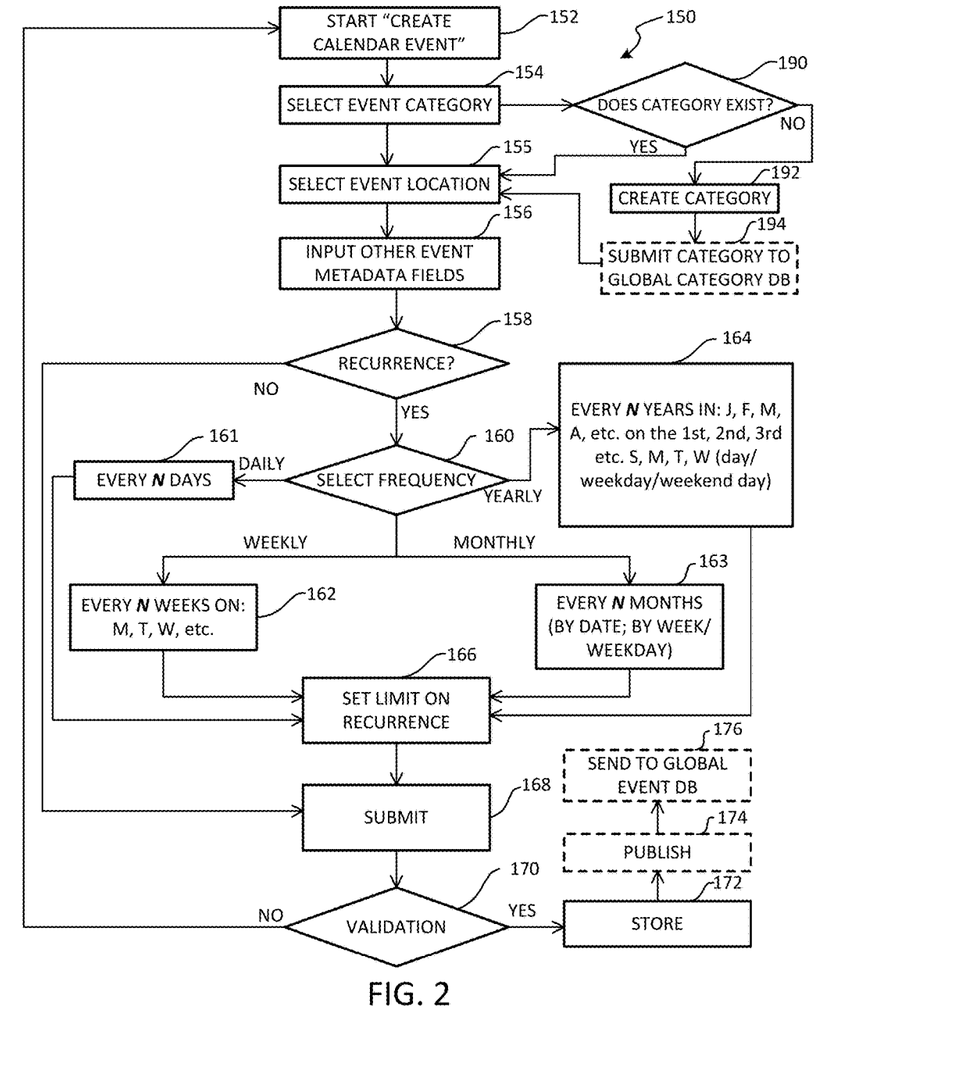
FIG. 2 is a flowchart illustrating a method of creating an event for a web-based calendar according to an embodiment of the invention.

FIG. 2 illustrates a method 150 of creating an event for a web-based calendar (e.g. calendar 106 of FIG. 1) according to one embodiment. Method 150 can be repeated each time an event is created for the calendar. Method 150 can be implemented as software contained in a program memory accessible to a processor of web server 102 of FIG. 1 The processor implements method 150 by executing software instructions provided by the software. A calendar administrator or editor (e.g. events publisher) can provide input to the software via a web-based administrative interface. Method 150 uses the calendar administrator's user input to create events for publication in calendar 106.

Method 150 starts at block 152 by receiving a user command from the calendar administrator to create a calendar event. Method 150 proceeds to block 154 by prompting the calendar administrator for a selection of an event category. If the calendar administrator specifies an event category that already exists in a predefined list of event categories (block 190), method 150 proceeds to block 155. Otherwise, the category is created at block 192. Optionally, at block 194 the created category is submitted to a global category database, such as category database 122 of FIG. 1, which maintains a list of event categories.

Once an event category has been selected at block 154, method 150 proceeds to block 155. At block 155, an event location or venue is entered. A similar process as shown for blocks 154, 190, 192 and 194 may be carried out at block 155, i.e. to determine whether the event location or venue already exists in a predefined list of event locations, and if not, creating the event location and sending it to a global location database, such as location database 120 of FIG. 1.

After inputting location or venue data at block 155, method 150 proceeds to block 156 by accepting input for other event metadata fields. For example, such metadata fields may include the event name or title, description, start time, end time, host, etc.

In the illustrated embodiment of FIG. 2, one of the event metadata fields that is presented is the recurrence field. If the recurrence option is not selected by the calendar administrator (block 158), method 150 proceeds to block 168 by submitting the event data. If the recurrence option is selected by the calendar administrator, then method 150 prompts for and receives input for the recurrence data. First, a frequency of the recurrence is selected at block 160 (e.g. daily, weekly, monthly or yearly). If the recurrence is daily, then at block 161 the calendar administrator enters the number of days N between recurrences. If the recurrence is weekly, then at block 162 the calendar administrator enters the number of weeks N between recurrences and the day of the week on which the event occurs. If the recurrence is monthly, then at block 163 the calendar administrator enters the number of months N between recurrences and the day on which the event occurs (e.g. specified by date or by week or weekday). If the recurrence is yearly, then at block 164 the calendar administrator enters the number of years N between recurrences and the day on which the event occurs (e.g. specified by month, day, weekday and/or weekend day). At block 166 a limit on recurrence is set by the calendar administrator (e.g. ends after a specified duration or by a specified date).

At block 168, the entered event data, including any recurrence data entered during the preceding steps, is submitted. At block 170 validation of the event data is performed. In some embodiments, for example, the geographical location of the event is verified against map data. If the event data does not pass validation, then method 150 returns to step 152 and prompts the calendar administrator to re-enter event data. If the event data passes validation, then method 150 proceeds to block 172 by storing the event data in an event database (e.g. event database 105 at web server 102 in FIG. 1).

At block 174, the event data may be published. In some embodiments only the calendar administrator has privileges to publish the event data. Other event contributors may have privileges to create and submit events for approval, but not to publish the event data at block 174.

Method 150 then proceeds to block 176 by sending the event data for the published event to a central event database (e.g. global event database 116 on global event server 118 in FIG. 1). The step at block 176 is optional. In some embodiments, the event data is not sent to the central event database. In some embodiments for example, the calendar administrator can configure the calendar settings to disable this feature or to send only a subset of the posted events to the central event database (e.g. those within a certain category or having certain tags).

Figure 3:
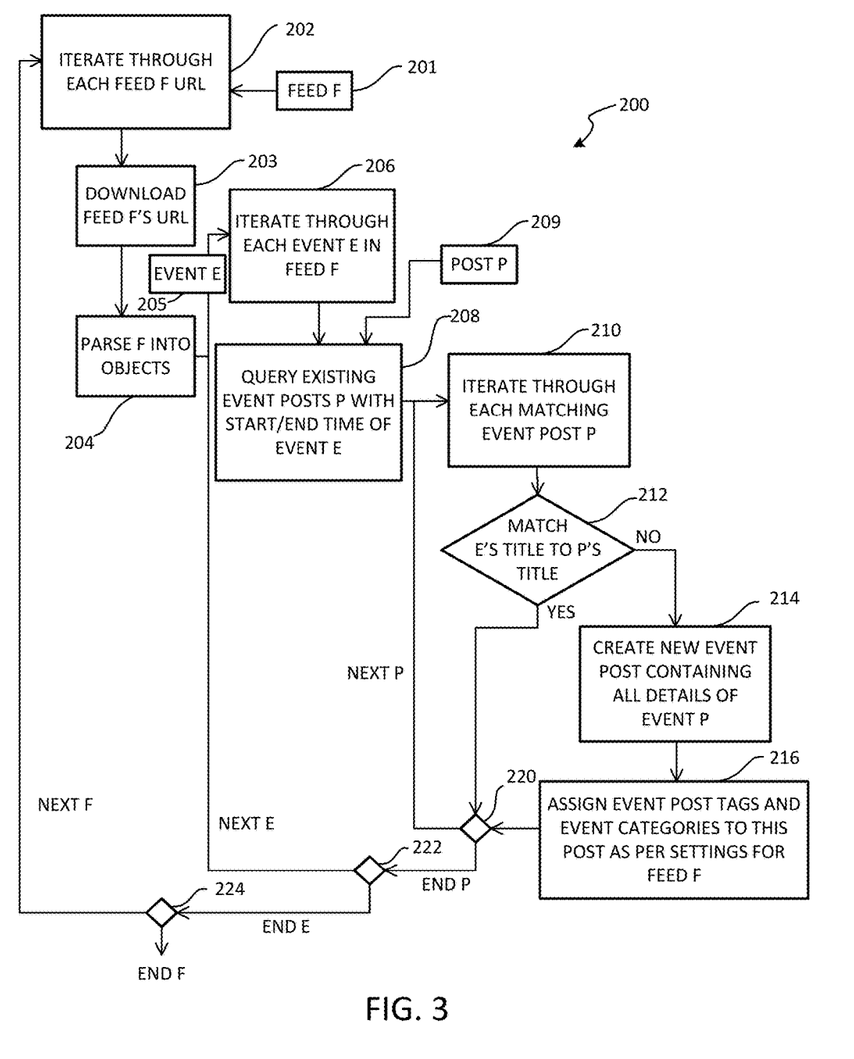
FIG. 3 is a flowchart illustrating a method of importing events from another calendar according to an embodiment of the invention.

By repeating method 150, a calendar administrator can create a series of upcoming events for publication in a website 103's online calendar 106. As described above, events can also be added to calendar 106 from other sources, such as events from calendars on other sites or global events database 116. FIG. 3 illustrates a method 200 of importing events from another calendar according to one embodiment. Method 200, for example, can be used to import into calendar 106A events from calendars 106A or 114 (FIG. 1). Method 200 can be implemented as software contained in a program memory accessible to a processor of web server 102 of FIG. 1 The processor implements method 200 by executing software instructions provided by the software.

Method 200 begins by retrieving one or more calendar feeds 201. For example, calendar feed 109 and/or 111 of FIG. 1 may be retrieved. In some embodiments, calendar feed 201 is an Internet Calendar and Scheduling (ICS) feed. Other types of calendar feeds may be accepted in other embodiments. When setting up a calendar, the calendar administrator (e.g. events publisher) can specify a url location for each calendar feed 201 to be imported to the calendar. The url for each calendar feed 201 may be input to the calendar software via a web-based administrative interface. The url for each calendar feed 201 can be stored as a setting for calendar 106. The settings for calendar 106 can also specify one or more categories and/or tags to be associated with the events in each calendar feed 201. For example, the calendar administrator who is creating calendar 106 may define in the settings that all events imported from calendar feed 109 of FIG. 1 are to be assigned the category "partner events" and that all events imported from calendar feed 111 of FIG. 1 are to be assigned the category "general".

Method 200 iterates through each calendar feed 201's url at block 202, and downloads the feed at the url at block 203. At block 204, calendar feed 201 is parsed into objects using an ICS parser library. One or more events 205 are extracted from calendar feed 201.

Method 200 iterates through each event 205 in calendar feed 201 at block 206. Each event 205 is compared against the existing event posts 209 in the calendar (e.g. any events previously created using method 150 of FIG. 2, for example). At block 208, method 200 queries the existing event posts 209 for any event posts with the same start or end time as event 205. If any event posts 209 having a start or end time matching those of event 205 are found, then method 200 proceeds to block 210 by iterating through each of the matching event posts 209.

To identify whether an event 205 has already been posted in event post 209, the titles of event 205 and event posting 209 are compared at block 212. If the event titles are the same, then method 200 proceeds to block 220. If the event titles do not match, then method 200 proceeds by creating at block 214 a new event post containing the details of event 205. At block 216, the new event post is assigned one or more categories or tags as defined by the settings for calendar feed 201. The method then proceeds to block 220.

Block 220 queries whether there are any remaining event posts 209 with a start or end time matching those of event 205. If there are any remaining matches, method 200 proceeds to another iteration at block 210 with the next matching event post 209. Otherwise, method 200 proceeds to block 222.

Block 222 queries whether there are any remaining events 205 in the calendar feed 201. If there are any remaining events 205 in the feed, method 200 proceeds to another iteration at block 206 with the next event 205 in the feed. Otherwise, method 200 proceeds to block 224.

Block 224 queries whether there are any remaining calendar feeds 201 to be imported (for example, as defined in the settings storing a list of calendar feed urls). If there are any additional calendar feeds 201 to be imported, method 200 proceeds to another iteration at block 202 with the next calendar feed 201. Otherwise, method 200 ends.

Adaptations may be made to method 200 of FIG. 3 for use in updating imported events in a calendar. For example, after a calendar feed 201 has been imported, method 200 may be performed each time an updated calendar feed 201 is downloaded. This may be accomplished by, at block 212, determining whether there is a matching title, and if there is a matching title, proceeding to update the existing event's metadata fields with the information for the event in the updated calendar feed, before proceeding to block 220. Otherwise, if there is no matching title, method 200 proceeds to create the new event at block 214 as shown.

Figure 4:
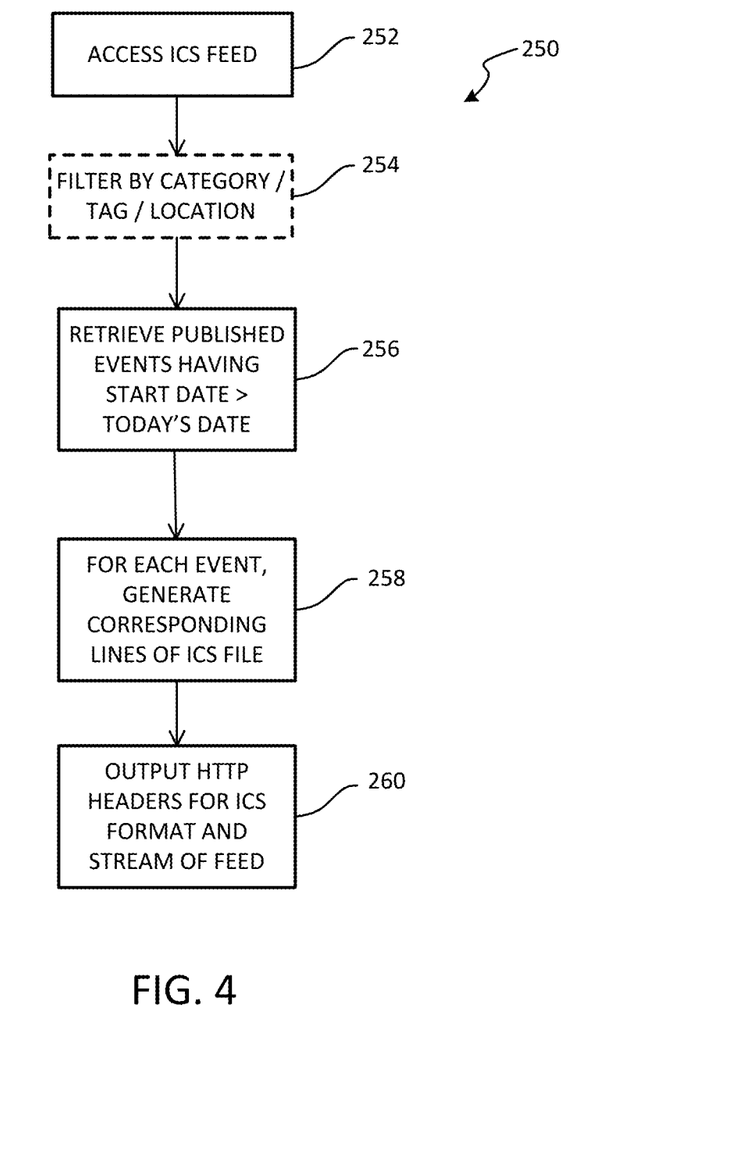
FIG. 4 is a flowchart illustrating a method of creating an event feed for exporting to another calendar according to an embodiment of the invention.

FIG. 4 illustrates a method 250 of creating an event feed for exporting to another calendar according to one embodiment. Method 250, for example, can be used to create a calendar feed for exporting one or more of the events from calendar 106A into Internet user 110's personal calendar 108 (FIG. 1). Method 250 can be implemented as software contained in a program memory accessible to a processor of web server 102A of FIG. 1 The processor implements method 250 by executing software instructions provided by the software.

Method 250 assumes that the calendar receiving the exported calendar feed is compatible with ICS calendar feeds. However, method 250 can be adapted to provided exported calendar feeds compatible with other formats or types of calendar feeds, in other embodiments.

Method 250 begins at block 252 by accessing an ICS calendar feed. For example, the ICS calendar feed may correspond to the events in website 103A's calendar 106A (see FIG. 1). At block 254, the events in the ICS calendar feed are optionally filtered by category, tag and/or location. Internet user 110 may have specified for example that he or she wants to export only events within a particular category. At block 256, method 250 retrieves the events (filtered according to block 254, if applicable) which have a start date greater than the present date. At block 258, for each event meeting the criteria of block 256, method 250 generates corresponding lines in an ICS file. Recurrence data for recurring events may be specified in ICS fields rather than expanded as separate events. Method 250 then proceeds to block 260 by outputting the HTTP headers for the ICS format and stream of feed.

Figure 5A:
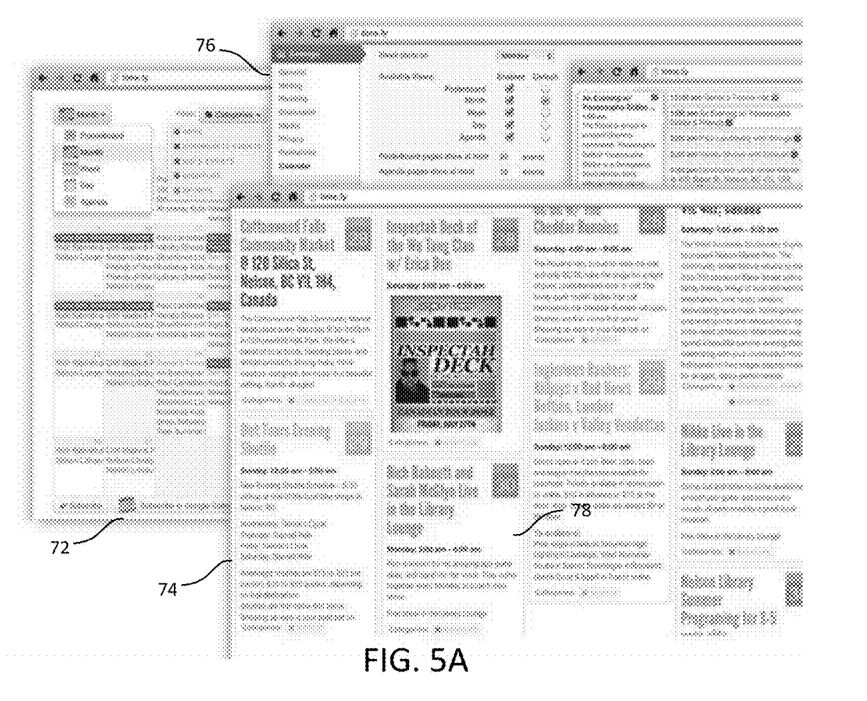
FIGS. 5A and 5B are exemplary screenshots of graphical user interfaces of a web-based calendar application according to embodiments of the invention.
Figure 5B:
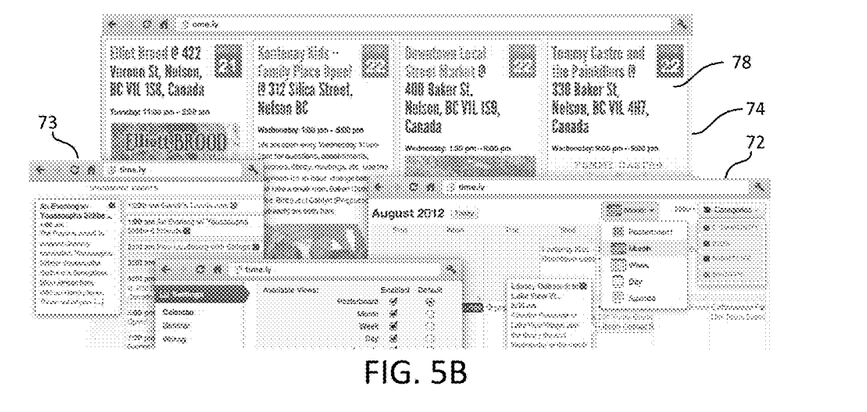

FIGS. 5A and 5A are exemplary screenshots of graphical user interfaces of a web-based calendar application according to certain embodiments. FIGS. 5A and 5B show a screenshot 72 of a month view of a web-based calendar and a screenshot 74 of a posterboard view of a web-based calendar. In month view, an entire month is displayed, with the event titles appearing within the days of the month. Clicking or hovering over the event title may cause more information about the event to be displayed (for e.g. in another box or window). In posterboard view, each event posting is displayed as a poster on the page. Each poster 78 displays the event title, location, date, start and end times, and description, and for some events, a graphic. FIG. 5B also shows a screenshot 73 of an agenda view of a web-based calendar. In agenda view, the events are listed by day. The time and title of the events may be displayed in agenda view.

FIG. 5A shows a screenshot 76 of a web-based administrative interface that may be used by a calendar administrator or event publisher to create a calendar for publication on a website. The calendar administrator may use the administrative interface to create events in accordance with FIG. 2's method 150. The calendar administrator may also use the administrative interface to define calendar settings. Such calendar settings may include a list of available event categories, the urls for the calendar feeds to be imported, and the categories and/or tags assigned to events imported from each calendar feed. Events from the calendar feeds may be imported to the calendar in accordance with FIG. 3's method 200.

According to some embodiments, ratings, comments, RSVPs or other feedback from a viewer of a web-based calendar may be provided. A web-based calendar application may receive a rating from Internet user 110 in connection with an event on online calendar 106, for example (FIG. 1). In some embodiments, the rating may consist of an integer within a range of integers (e.g. from 0 to 10, or 0 to 5) wherein the highest number indicates the highest or most favourable rating, and the lowest number indicates the lowest or least favourable rating (or vice versa). In other embodiments, the rating may be a selection of a phrase from a plurality of available phrases indicative of the user's interest in attending the event.

As will be appreciated upon reading this description, the calendar system and methods described herein provide a number of benefits to both event publishers and event seekers. By allowing for different calendars to be connected together through the import feature (e.g. as described with reference to method 200 of FIG. 3), an event publisher can build a calendar that posts upcoming events from a number of different sources. As such, a comprehensive event calendar can be created without requiring extensive Internet searches or reviews of individual websites. The event publisher can keep the event information in the calendar up to date through the periodic automatic queries and updates described herein.

Local entertainment guides, tourism sites, event promoters, community interest groups, business associations, and other event publishers which wish to compile event information from a number of different sources may find these calendar tools to be particularly helpful. Event organizers which have published their events on a website may also find these calendar tools to be advantageous, given that the publication of their events on another site's calendar (e.g. by an event publisher which compiles events from different sites) provides additional exposure for the event organizers and their events.

Event seekers (i.e. Internet users wanting to find out about events that they may be interested in attending) may appreciate the convenience of being able to consult a single calendar created by an event publisher which collects together event feeds from different sources, rather than having to consult different websites to learn of upcoming events in their community. Event seekers may also appreciate the convenience of subscribing to a calendar or event feed. As explained above, an event seeker can choose to filter the event feed by category, tag and/or location so that only those events matching the category, tag and/or location are displayed or subscribed to by the event seeker.

Where a component (e.g. a server, client device, database, software module, processor, program memory, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments of the invention.

While a number of exemplary aspects and embodiments have been discussed above, those of skill in the art will recognize certain modifications, permutations, additions and sub-combinations thereof. It is therefore intended that the scope of the following appended claims and claims hereafter introduced should not be limited by the embodiments set forth in the examples, but should be given the broadest interpretation consistent with the description as a whole.

What is claimed is:

1. A method for generating a calendar for publication on a first website, the method performed by a computer processor and comprising:

Retrieving from a web server a calendar feed comprising at least one event, the calendar feed corresponding to a second calendar published on a second website, wherein the calendar feed is an Internet and Calendar Scheduling (ICS) feed;

for each one of the events in the calendar feed, determining whether there is a corresponding event post in the calendar, and creating in the calendar a new event post for the event if there is no corresponding event post, wherein creating a new event post comprises assigning metadata to the event post for the purposes of facilitating downstream publication and combinations of event feeds; and retrieving an updated calendar feed from the web server;

for each one of the events in the updated calendar feed, determining whether there is a corresponding event post in the calendar; and if there is a corresponding event post in the calendar, updating the corresponding event post with information corresponding to the event, otherwise, if there is no corresponding event post in the calendar, creating in the calendar a new event post for the event, wherein retrieving the updated calendar feed from the web server comprises receiving a push notification from the web server providing notification of an update to the calendar feed, and wherein assigning the metadata to the event post comprises assigning at least one of a category and tag to the event based on a predefined setting for the calendar feed.

2. The method according to claim 1, wherein retrieving an updated calendar feed from the web server comprises querying the web server for updates.

3. The method according to claim 1, comprising receiving, from an administrator of the first website, event data for a new event and entering the new event in the calendar based on the event data, wherein entering the new event comprises assigning at least one of a category and tag to the new event.

4. The method according to claim 3, wherein entering the new event comprises defining recurrence data for the event.

5. The method according to claim 3, wherein entering the new event comprises sending event information corresponding to the new event to a global event database.

6. The method according to claim 3, wherein entering the new event comprises validating the event data for the new event prior to publication of the new event on the first web site.

7. The method according to claim 6, wherein validating the event data comprises verifying a geographical location of the event, as specified in the event data, against map data.

8. The method according to claim 1, wherein determining whether there is a corresponding event post in the calendar comprises comparing at least one of a start time and end time of the event with corresponding start times and end times of the previously created event posts.

9. The method according to claim 8, wherein determining whether there is a corresponding event post in the calendar comprises comparing a title of the event with a title of each of the previously created event posts.

10. The method according to claim 1, comprising, for one or more event posts in the calendar, accepting an event rating from an Internet user.

11. The method according to claim 10, comprising storing a plurality of event ratings received for each event post in a database and displaying a statistical representation of the event ratings for each event post.

12. A system for generating a calendar for publication on a first website, the system comprising:

a global event server comprising a computer processor that stores information about event posts which have been created in the calendar and one or more other calendars;

a first web server comprising a computer processor that:

retrieves from a web server a calendar feed comprising at least one event, the calendar feed corresponding to a second calendar published on a second website, wherein the calendar feed is an Internet and Calendar Scheduling (ICS) feed;

for each one of the events in the calendar feed, determines whether there is a corresponding event post in the calendar, and, if there is no corresponding event post, creates in the calendar a new event post for the event, wherein in creating the new event post, metadata is assigned to the event post for the purposes of facilitating downstream publication and combinations of event feeds;

retrieves an updated calendar feed from the web server;

for each one of the events in the updated calendar feed, determines whether there is a corresponding event post in the calendar; and if there is a corresponding event post in the calendar, updates corresponding event post with information corresponding to the event, otherwise, if there is no corresponding event post in the calendar, creates in the calendar a new event post for the event, wherein retrieving the updated calendar feed from the web server comprises receiving a push notification from the web server providing notification of an update to the calendar feed, and wherein assigning the metadata to the event post comprises assigning at least one of a category and tag to the event based on a predefined setting for the calendar feed.

13. The system according to claim 12, wherein the first web server retrieves an updated calendar feed from the web server by querying the web server for updates.

14. The system according to claim 12, wherein the first web server retrieves an updated calendar feed from the web server by receiving a push notification from the web server indicating an update to the calendar feed.

* * * * *